United States Patent [19]

Reynolds et al.

[11] Patent Number: 4,560,097

[45] Date of Patent: Dec. 24, 1985

[54] SAFETY HARNESS FOR MOTORCYCLE PASSENGER

[76] Inventors: John F. Reynolds; Janie B. Reynolds, both of 220 Allouette #3, Carson City, Nev. 89701

[21] Appl. No.: 608,542

[22] Filed: May 9, 1984

[51] Int. Cl.$^4$ .............................................. B62J 23/00
[52] U.S. Cl. .................................. 224/160; 224/30 R; 224/42.42; 280/290
[58] Field of Search ..................... 244/151 R; 224/184, 224/275, 158–161, 30 R, 42.42; 280/290; 2/305, 102, 93, 94, 300, 311; 119/96, 101

[56] References Cited

U.S. PATENT DOCUMENTS

| | | | |
|---|---|---|---|
| 602,609 | 4/1898 | Tatro | 280/290 X |
| 1,307,597 | 6/1919 | Orloff | 224/160 X |
| 1,857,375 | 5/1932 | Hoffman | 244/151 R |
| 2,170,703 | 8/1939 | Waxman et al. | 119/96 |
| 2,643,836 | 6/1953 | Carroll | 244/151 R |
| 2,887,286 | 5/1959 | Moran | 244/151 R X |
| 3,276,432 | 10/1966 | Murcott | 119/96 |
| 3,481,517 | 12/1969 | Aukerman | 224/160 |
| 3,940,166 | 2/1976 | Smithea | 280/290 |
| 4,026,245 | 5/1977 | Arthur | 119/96 |
| 4,028,742 | 6/1977 | Marquis | 2/93 X |
| 4,106,121 | 8/1978 | Belson | 2/102 |
| 4,271,998 | 6/1981 | Ruggiano | 224/160 |
| 4,272,852 | 6/1981 | Bell | 224/182 X |
| 4,273,216 | 6/1981 | Weissmann | 2/94 X |
| 4,324,205 | 4/1982 | Goldmacher | 119/96 |
| 4,402,440 | 9/1983 | Purtzer et al. | 224/160 |
| 4,445,866 | 5/1984 | Cillieres | 119/96 X |

FOREIGN PATENT DOCUMENTS

| | | | |
|---|---|---|---|
| 1011731 | 7/1957 | Fed. Rep. of Germany | 224/160 |
| 12713 | of 1890 | United Kingdom | 280/290 |

Primary Examiner—Stephen Marcus
Assistant Examiner—Robert Petrik
Attorney, Agent, or Firm—Browdy and Neimark

[57] ABSTRACT

A safety harness for securing a child passenger to the driver of a motorcycle comprises a vest to be worn by the child and two straps connected together to form two continuous loops and also being connected to the vest. These loops embrace the back of the vest from top to bottom and extend forwardly thereof to form shoulder loop portions to be worn by the driver. Preferably the straps crossover below the vest and are sewn at this crossover, the legs of the child straddling the crossover. The vest may be laced-up at the back between the loops and have a zipper at the front.

15 Claims, 5 Drawing Figures

SAFETY HARNESS FOR MOTORCYCLE PASSENGER

FIELD OF THE INVENTION

This invention relates to a safety harness for the passenger on a motor cycle, particularly when the passenger is a child.

BACKGROUND OF THE INVENTION

The safety of children when being transported has always been of concern and continues to receive serious attention. Infant harnesses have for a very long time been used for retaining young infants in their high chairs and perambulators. Child harnesses and seats are used in automobiles both to restrain the child and hold children in position if the vehicle is subjected to a sudden or severe manoeuvre such as braking or swerving. Infant carriers are also known for carrying an infant on the back of a parent, such carriers having straps to pass around the shoulders of the parent.

However, there still exists a need for protecting a child from falling off a motor cycle when riding as a pillion passenger thereon.

SUMMARY OF THE INVENTION

It is an object of the present invention to provide a safety harness for attaching the passenger on a motor cycle, particularly when a child, to the driver of the motor cycle.

A feature by which this object is achieved is by providing a vest to be worn by the passenger, and having a pair of straps attached to the vest and forming shoulder loops to be worn by the driver. This provides the advantage that the upper torso of the passenger is securely attached to the driver so that the passenger will stay with the driver.

It is a further object of the invention to provide such a safety harness that is completely restrained from coming off the passenger, particularly a child.

A feature by which this is achieved is by attaching the straps to the back of the vest and crossing the straps over below the vest so that two large crossing over loops are formed that pass between the legs of the passenger. This has the advantage that not only does the vest envelop the passenger, but additionally the straps "lock" the passenger in the vest even if the vest should inadvertently come loose.

Accordingly, therefore, there is provided by the present invention a safety harness for securing a passenger to the driver of a motorcycle, comprising a vest to be worn by the passenger, and two loops comprising two straps and being connected to the vest. These loops preferably embrace the back of the vest and extend forwardly of the vest to form shoulder loop portions to be worn by the driver. Advantageously the loops may be attached to the back of the vest from top to bottom.

Preferably, the loops crossover below the vest and are secured together, for example by sewing, at the crossover, the legs of the passenger straddling this crossover.

The vest can advantageously be laced up at the back and have a zipper at the front making it adjustable in size and easy to put on. In this way the vest can be worn over normal motorcycling outer clothing.

Preferably the shoulder loops are adjustable in length and have means for stowing them out of the way when the passenger is not on the motorcycle.

Other objects, features and advantages of the present invention will become more fully apparent from the following detailed description of the preferred embodiment, the appended claims and the accompanying drawings.

DETAILED DESCRIPTION OF THE PREFERRED EMBODIMENT

Figure 1:
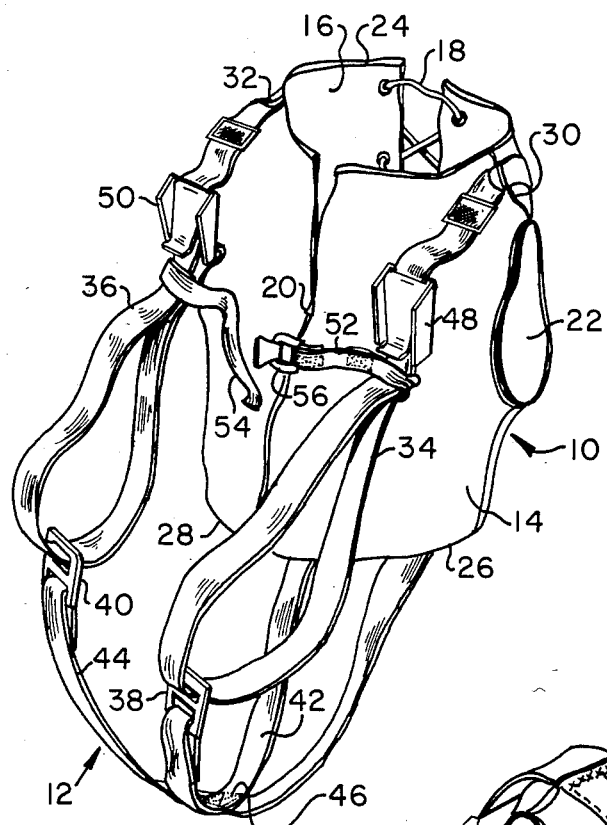
FIG. 1 illustrates a front perspective view of a child's safety vest according to the invention.
Figure 3:
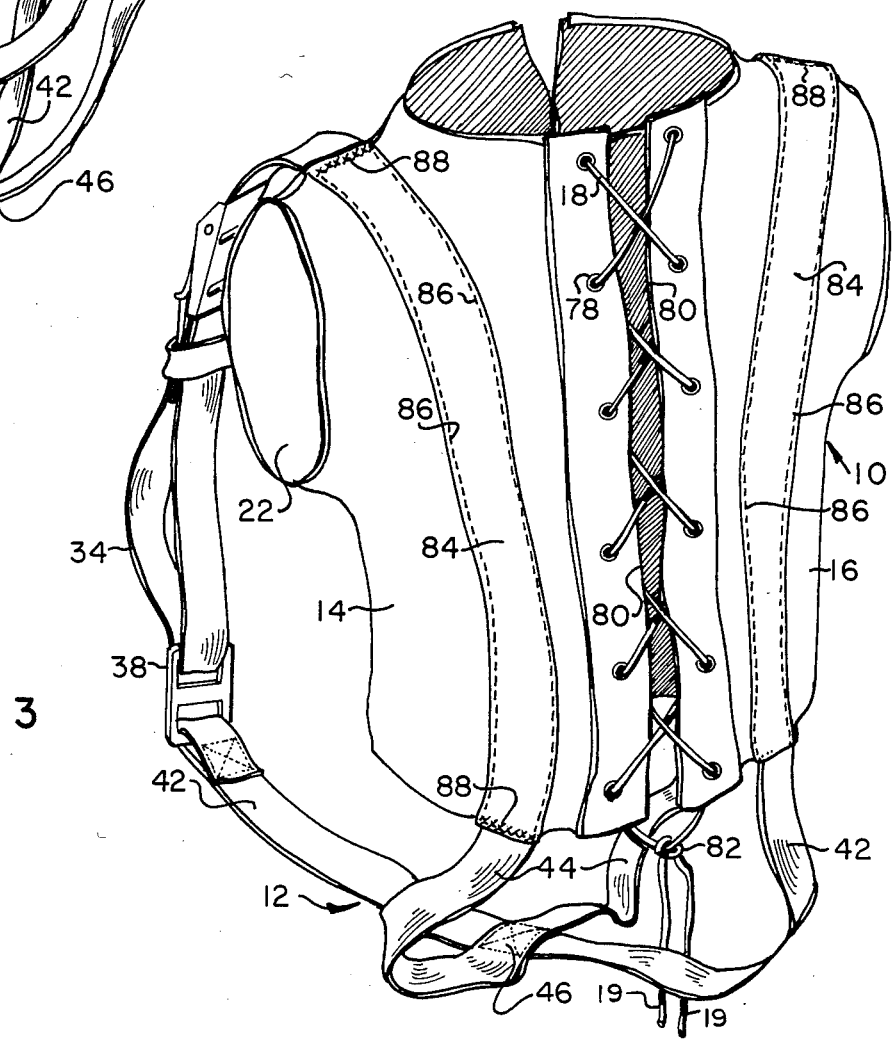
FIG. 3 illustrates a rear perspective view of the safety vest of FIGS. 1 and 2.
Figure 2:
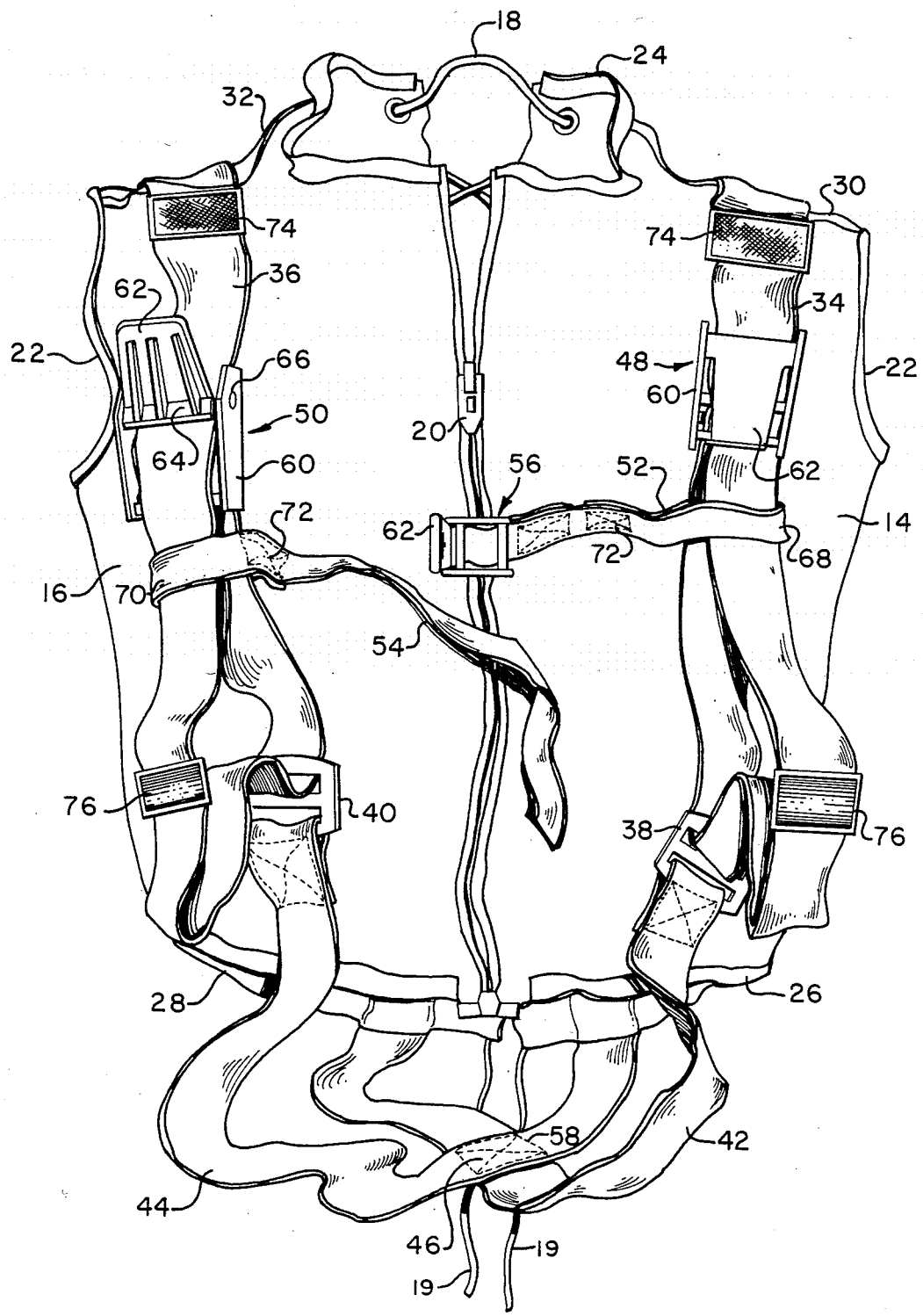
FIG. 2 illustrates, on a larger scale, a front view of the safety vest of FIG. 1.

The preferred embodiment of the present invention is shown in FIGS. 1, 2 and 3. To more readily appreciate the construction of this embodiment, these Figs. should be viewed together, although they will now be described in sequence.

FIG. 1 shows a sleeveless child's vest 10 having a harness 12 attached thereto and extended to the front of the vest. The vest 10 has two body panels 14, 16 connected at the back by lacing 18 and at the front by a zipper 20. Each body panel 14, 16 has an arm opening 22 therein, and the upper seamed edges of the body panels 14, 16 define a neck opening 24. The bottom seamed edges 26, 28 of the body panels 14, 16 define a waist opening. Shoulder seams 30, 32 extend between the tops of the arm openings 22 and the sides of the neck opening.

The harness 12 comprises two adjustable straps 34, 36 of strong webbing, e.g. of nylon, polyester or polypropylene, connected at the top to the vest 10 adjacent the shoulder seams 30, 32. The lower looped ends of the straps 34, 36 pass through strap connectors 38, 40 and are thereby connected to leg straps 42, 44 which crossover at 46 and are connected to the bottom of the vest 10 at the rear thereof. The leg straps 42, 44 are integral and continuous with the straps 36, 34, respectively, as will be described more fully later. The length of the straps 34, 36 can be adjusted by releasable clamping strap buckles 48, 50. A narrower interconnecting strap having two parts 52, 54 is arranged to connect the straps 34, 36 below the buckles 48, 50. The part 52 is looped around and so connected to the strap 34, and the part 54 is similarly connected to the strap 36. The free end of the part strap 52 terminates in a releasable clamping buckle 56 for releasably and adjustably connecting the two parts 52, 54 together to form in use a chest strap, as will be more fully described later.

FIG. 2 shows more clearly the construction described above. The leg straps 42, 44 can be seen extending downwardly from the lower edge seams 26, 28 at the back of the body panels 14, 16 somewhat adjacent the free dangling ends 56 of the rear lacing 18. At their crossover 46, the leg straps 42, 44 are secured attached together by stitching 58. Each clamping buckle 48, 50 and 56 comprises a frame 60, to which a strap end is attached, having side members to which a hand flap 62 having a clamping flange 64 is pivoted as shown at 66. The buckle 48 is shown with its flap closed in the clamping mode, and the buckles 50 and 56 are shown with their flaps 62 open in an adjustable mode and released mode, respectively. Each strap 34, 36 extends downwardly from its end attached to the buckle 48, 50, respectively, and is doubled over through its respective connector 38, 40, and then extends upwardly through its buckle 48, 50 to the respective shoulder seam 30, 32. The outer ends of the strap parts 52, 54 form loops 68, 70 around the doubled over portions of straps 34, 36, these loops 68, 70 being completed by stitching 72. Each strap 34, 36 has secured to the outer surface thereof a pair of spaced apart Velcro strips or pads 74, 76. Each Velcro strip 74 is located just below and adjacent the respective shoulder seam 30, 32, and each Velcro strip 76 is located on the outside run of the doubled over portion of the straps 34, 36. The function of these velcro strips is to enable the straps 34, 36 to be effectively shortened and held in a stowed position with the strips 76 releasably secured over and to the strips 74 for a purpose to be described later.

FIG. 3 shows more clearly the lacing 18 at the back of the vest 10 and the attachment of the straps of the harness 12 to the back of the vest. The lacing 18 connects in crisscross fashion eyelets 78 spaced apart adjacent and along the vertical edges 80 of the body panels 14, 16 at the middle of the back of the vest 10. The dangling free ends 19 of the lacing 18 is knoted at 82 after the lacing has been tightened or loosened to adjust the size of the vest 10 to that of the child who is to wear it. The straps of the harness 12 extend continuously down the full length of the back of the vest and are secured thereto by rows of stitching 88 across the straps adjacent the vest's neck and bottom seams, and by strips 84 of vest fabric sewn along each edge at 86 to the back of the vest and extending the full length thereof. Thus, at the back of the vest, the harness straps are covered by these strips 84 with the rows of stitching 86 preventing lateral movement of the straps, and the cross stitching 88 adjacent the upper and lower seams 30, 32 and 26, 28 preventing longitudinal movement of the straps. As can be seen, the front strap 34 extends rearwardly over the left shoulder in FIG. 3, down the left side of the back of the vest, and then emerges from the vest back as leg strap 44 which in turn extends under the vest and then upwardly to its connection at 40 (see FIG. 1) to the other front strap 36. Similarly, the left leg strap 42 extends downwardly from the connector 38, under the vest, up the right hand side of the vest back, and then extends forwardly from the right shoulder seam to form the right hand front strap 36. It will be noticed that the enclosed straps on the back of the vest 10 diverge slightly as they extend upwardly.

The vest 10 can be constructed in any known manner including having sleeves if desired, provided it is strong enough to maintain its integrity when a child wearing the vest is supported by the straps of the harness 10. The fabric of the vest can advantageously be woven from multifilament nylon yarn.

Figure 4:
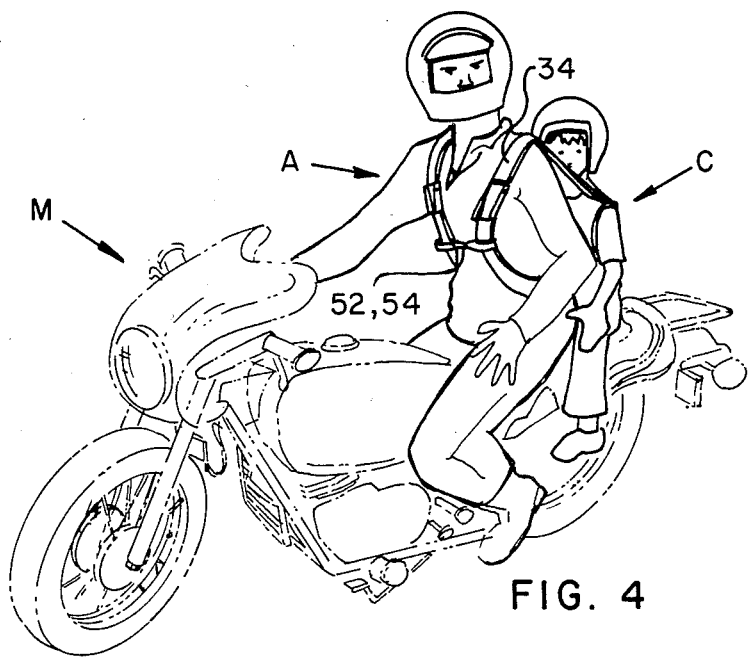
FIG. 4 illustrates, partly from the front, the safety vest of FIGS. 1 to 3 in use by a child on a motorcycle driven by an adult.
Figure 5:
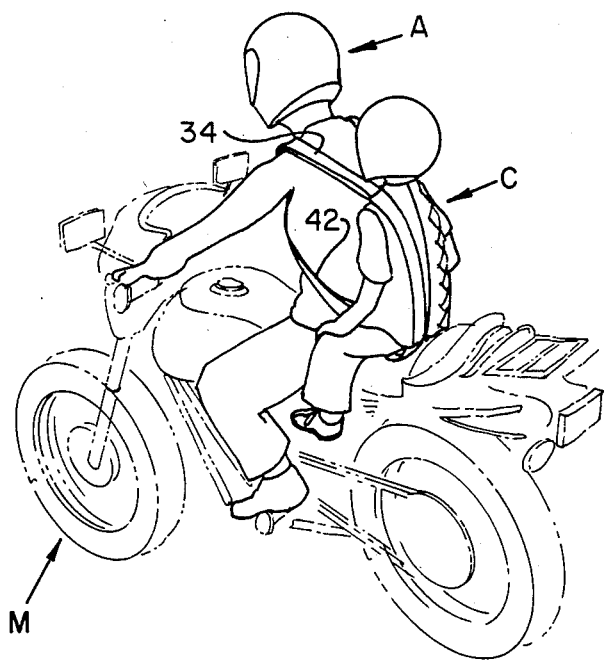
FIG. 5 is a similar view to FIG. 4 but partly from the rear.

The use of this safety vest is illustrated in FIGS. 4 and 5 which show an adult A seated on a motorcycle M with a child pillion passenger C attached to the adult by the harness 12.

To use the safety vest, with the zipper 20 completely undone, the child places his or her legs through the looped leg straps 42, 44 on each side of the crossover connection 46. The child then puts the vest 10 on by extending his or her arms outwardly through the two arm openings 22 and completely zipping-up the zipper 20. During this procedure the crossover strap connection 46 is drawn up under the child's crotch. The lacing 18 is adjusted, if necessary, to ensure that the vest 10 is a snug but comfortable fit. The front straps are adjusted via the buckles 48, 50 to an appropriate length for the adult driver. Then, with the adult and the child correctly seated on the motorcycle, the adult slips his arms through the shoulder loops formed by the forwardly extending front 34, 36 and leg 42, 44 straps. The two parts 52, 54 of the interconnecting strap are then connected and adjusted via the buckle 56 to form a chest strap across the chest of the adult to retain the shoulder loops of the harness 12 securely in place on the shoulders of the adult. The child is now securely attached to the adult. It should be noted, as best seen in FIG. 5, that the strap 34 extends upwardly as well as forwardly from the child and the leg strap 42 similarly extends upwardly as well as forwardly from between the child's legs.

When it is time to dismount, the adult undoes the chest strap 52, 54 and slips off the shoulder loops. These shoulder loops can then be neatly stowed out of the way by securing the Velcro strips 76 over the top of the corresponding Velcro strips 74, leaving the individual strap parts 52, 54 hanging down. With the shoulder loops so stowed, the child can now move around freely with the vest 10 still being worn, for example if riding is to be resumed after a short interval.

It will be appreciated that by having no collar above the neck opening, no arm sleeves, and having the vest of fairly short jacket length, the vest of the safety harness can readily be worn over the normal top clothing worn by the child on the motorcycle. The adjustability of the back lacing enables the vest to be readily adjusted in size to accommodate different thicknesses and bulkiness of the top clothing. Further, the vest can be of somewhat light weight, but strong, fabric which may be of a bright, readily seen safety color, e.g. fluorescent orange.

Although it is preferred to retain the vest as a separate garment, if desired the vest could have trousers detachably connected thereto or even integral therewith. Further, although the safety harness is primarily intended for children, it could be adapted for use by adults.

It will be appreciated that the main purpose of the safety harness is to aid a motorcycle rider in carrying a small passenger in a more safe manner than just having the child sit on the back of the motorcycle.

The above described embodiment, of course, is not to be construed as limiting the breadth of the present invention. Modifications, and other alternative constructions, will be apparent which are within the spirit and scope of the invention as defined in the appended claims.

We claim:

1. A safety harness for attaching two persons together, one behind the other, comprising:
    a vest to be worn by the one person, and having a neck opening with shoulder portions on each side thereof, a front and a back;
    two straps extending freely forwardly from the shoulder portions, downwards past the front of the vest and returning under the vest to the back of the vest;

said straps crossing over below said vest to form leg loops for said one person; and said straps being extendable forwardly of the vest to form shoulder loops which can be located over the shoulders of the other person located in front of said one person and to whom said one person is thereby attached.

2. The safety harness of claim 1, wherein said straps are attached together at their crossing over.

3. The safety harness of claim 1, wherein said straps are sewn together where they cross over.

4. The safety harness of claim 1, wherein said straps extend down the back of the vest and are attached to said back.

5. The safety harness of claim 1, wherein said straps include means for adjusting the size of said shoulder loops.

6. The safety harness of claim 5, wherein said adjusting means comprises a buckle.

7. The safety harness of claim 1, wherein each said strap is attached to and also has a portion passing movably through a buckle thereby forming a doubled over portion of the strap, and the size of each shoulder loop is adjustable by moving the respective strap through said buckle and changing the size of said doubled over portion.

8. The safety harness of claim 1, wherein an interconnecting strap connects said shoulder loops for securing them together in front of the other person.

9. The safety harness of claim 8, wherein said interconnecting strap comprises two parts adjustably connectable together.

10. The safety harness of claim 1, further comprising means, associated separately with each strap, for releasably stowing the shoulder loops of the straps in a folded position in front of said one person when not in use.

11. The safety harness of claim 10, wherein said stowing means comprises two spaced apart self adhering strips on each strap.

12. The safety harness of claim 1, wherein said vest comprises two body panels each having an arm opening therein, said panels being releasably connected together.

13. The safety harness of claim 12, wherein said panels are releasably connected by a zipper.

14. The safety harness of claim 13, wherein said zipper extends down the front of said vest, and said panels are adjustably connected together at the back of said vest by lacing.

15. A safety harness for attaching a child passenger behind a motorcycle rider, comprising:

a vest to be worn by the child and having a neck opening, a front, a back, and two arm openings;

said vest comprising two body panels each having one of said arm openings therein, said panels being connected together at the back of the vest by lacing and at the front of the vest by a zipper;

a pair of straps connected together to form two continuous loops;

said straps being attached to said back on each side of said lacing and extending freely forwardly of said vest from shoulder portions thereof to define shoulder loops portions to be worn by said motorcycle rider;

said pair of straps crossing over below said vest and being secured together at the crossing over to form let loop portions for the child's legs to engage through;

means for adjusting the length of said shoulder loop portions;

means, associated separately with each strap, for releasably stowing the shoulder loop portion of the respective strap in a folded position in front of said vest when not in use;

an interconnecting strap connected to said shoulder loop portions for connecting said shoulder loop portions together over the chest of said motorcycle rider;

a connector attached to one end of each strap;

a buckle attached to the other end of each strap; and a portion of each strap extending from the buckle of that strap, through the connector attached to the other strap, and doubling over on itself to return through the same buckle.

* * * * *